Figure 1:
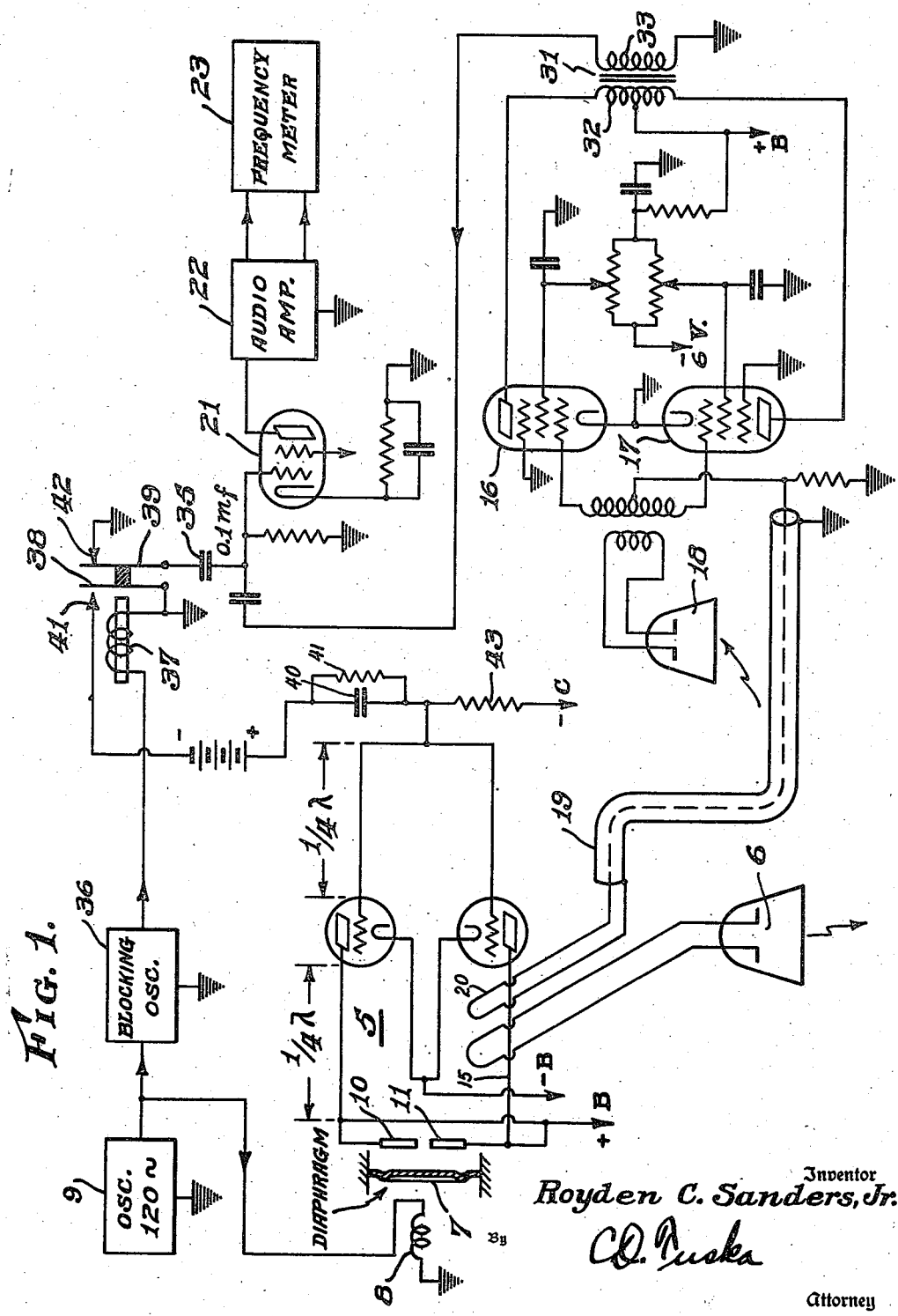

July 29, 1947.　　　R. C. SANDERS, JR　　　2,424,854
PULSED FREQUENCY MODULATED ALTIMETER
Filed Aug. 29, 1942　　　2 Sheets-Sheet 1

Inventor
Royden C. Sanders, Jr.
C.D. Tuska
Attorney

July 29, 1947.  R. C. SANDERS, JR  2,424,854
PULSED FREQUENCY MODULATED ALTIMETER
Filed Aug. 29, 1942   2 Sheets-Sheet 2

Inventor
Royden C. Sanders, Jr.
Attorney

Patented July 29, 1947

2,424,854

UNITED STATES PATENT OFFICE 2,424,854

PULSED FREQUENCY MODULATED ALTIMETER

Royden C. Sanders, Jr., Haddonfield, N. J., assignor to Radio Corporation of America, a corporation of Delaware Application August 29, 1942, Serial No. 456,602

2 Claims. (Cl. 250—1.68)

My invention relates to radio systems for measuring distance or rate of change in distance and particularly to altimeters or other distance measuring systems of the frequency modulated type and to speed indicating systems operating on the Doppler effect.

Systems of the above described types are well known, frequency modulated or F. M. altimeters being described in Bently Patent 2,011,392 and in Espenschied Patent 2,045,071, for example. In determining distance, such as altitude, the radiated frequency modulated wave is reflected from the earth's surface or other object and the reflected wave is received in a heterodyne receiver located in the vicinity of the transmitter. The heterodyning or mixing signal for the receiver is obtained directly from the transmitter whereby the receiver output includes a signal of "difference frequency" which frequency is determined by the time required for the radiated signal to reach the reflecting object and return to the receiver.

In utilizing the Doppler effect to determine speed or rate of change in distance, the radiated wave is not frequency modulated. Instead, the change in the frequency of the reflected wave due to the Doppler effect is determined by mixing an unmodulated wave before reflection with the wave after reflection to find their difference frequency. Thus the ground speed of an aircraft may be determined, for example.

An object of the present invention is to provide systems of the above described type that give an improved signal-to-noise ratio.

A further object of the invention is to provide improved distance and speed indicating apparatus that will have a large distance range for the size of the power tubes and other transmitter components employed.

The invention, as applied to a Doppler speed indicator or to an F. M. altimeter or distance indicator includes means for causing the transmitter to oscillate or amplify periodically so as to radiate pulses of energy. The duration of each pulse is considerably longer than the propagation time necessary for a signal to reach the reflecting surface and return. This is the direct opposite of what is required in pulse-echo systems. The pulse repetition rate should be fast enough so that information is given the observer as frequently as desired and the indicator or frequency meter used should be of such a design as to provide the proper damping or decay characteristics.

In the application of this invention to a F. M. altimeter or distance indicator, the pulse length preferably should be at least a full frequency modulation cycle long. The pulse repetition rate should be synchronized with the modulation frequency if the frequency modulation is non-linear over the modulation cycle and if the pulse length is not considerably longer than the modulation cycle. Preferably the receiver is blocked or shorted between pulse radiations to prevent noise from affecting the frequency meter. By practicing my invention the distance range is increased by a factor of approximately $\sqrt{n}$ where the transmitter is radiating $1/n$ of the total time.

Figure 2:
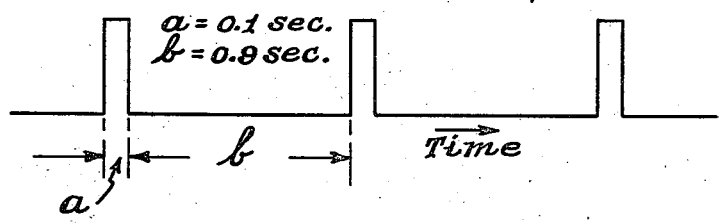
Figure 3:
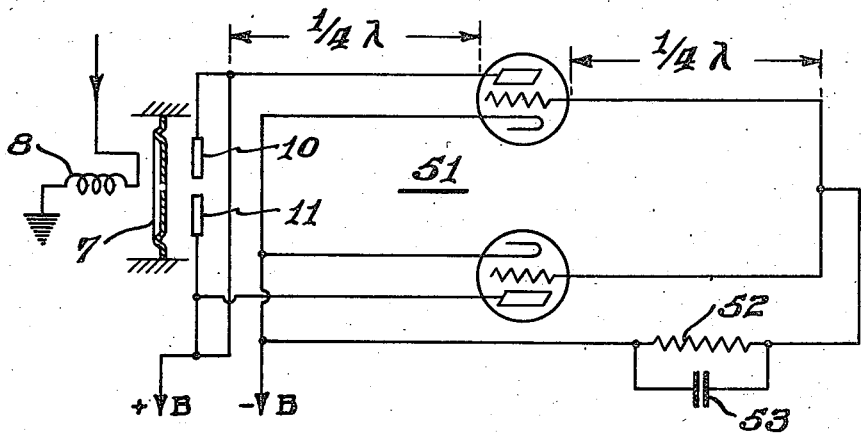

The invention will be better understood from the following description taken in connection with the accompanying drawing in which Figure 1 is a circuit diagram of a system embodying my invention; Figure 2 is a graph that is referred to in explaining the invention; and Figure 3 is a circuit diagram of an oscillator that may be substituted for a portion of the circuit of Fig. 1. In the several figures like parts are indicated by the same reference characters.

Referring to Fig. 1, the altimeter comprises a frequency modulated radio transmitter having an oscillator 5 coupled to a dipole antenna 6 which radiates a frequency modulated signal toward the earth. Such a signal is produced by cyclically sweeping the frequency of the carrier wave of the oscillator 5 through a frequency band, i. e., by cyclically frequency modulating the carrier wave. This may be done by means of a diaphragm 7 that is vibrated by a driving coil 8 supplied with current from an audio oscillator 9 operating at a frequency of 120 cycles per second, for example. Since the diaphragm 7 is in capacity relation to a pair of capacity elements 10 and 11 in the anode circuit of the oscillator 5, the radiated signal is swept through a certain frequency range 120 times per second.

The receiver may comprise two vacuum tubes 16 and 17 which are connected in balanced relation. The reflected signal is picked up by a dipole 18 and applied to the input circuits of these tubes in push-pull relation. The heterodyning signal is applied directly from the transmitter oscillator 5 over a line 19 in parallel or in phase relation to the input circuits of the tubes 16 and 17, this signal being the same as that radiated from antenna 6. The coupling from the oscillator 5 to the line 19 may be from the tuned plate circuit 15 to a loop 20 at the end of the line 19 as illustrated. Since the received signal and the heterodyning signal have one phase relation at the control grid of tube 16 and have the opposite phase relation at the control grid of tube 17, and since, as described below, the output circuits of the tubes are connected in phase opposition, this particular receiver has the advantage that any amplitude modulation is balanced out while the desired difference frequency is obtained. The difference or beat frequency signal is supplied through an amplifier tube 21 and an audio amplifier 22 to a suitable frequency indicator 23. This particular type of balanced receiver is described and claimed in the copending application of Wolff and Sanders, Serial No. 445,010, filed May 29, 1942.

The output circuit of the balanced detector includes a transformer 31 that has a center-tapped primary 32 and a secondary 33. Anode voltage is supplied from a suitable "B" supply (not shown) through the center tap and through opposite halves of the primary 32 to the anodes of tubes 16 and 17. The secondary 33 supplies the output signal to the amplifiers 21 and 22 to the frequency counter or indicator 23.

In accordance with my invention the oscillator 5 is caused to radiate a signal intermittently as illustrated in Fig. 2. At the same time that the signal is radiated, a short circuit connection is removed from the receiver amplifier 21 which is normally shorted by a capacitor 35 having a fairly large capacity such as 0.1 mf. The above operation may be obtained by providing a relaxation oscillator such as a blocking oscillator 36 which preferably is locked in with oscillator 9 to produce pulses in a fixed time relation to the 120 cycle output of oscillator 9. The output of oscillator 36 passes through a relay coil 37 to actuate two armatures 38 and 39 whereby a circuit is closed at a contact point 41 and another circuit is opened at contact point 42.

Closing the circuit at contact point 41 applies positive voltage through a coupling capacitor 40 and a leak resistor 41 to the grids of oscillator 5 so that this oscillator, which is normally blocked by negative bias applied through a resistor 43, is momentarily unblocked. The simultaneous opening of the circuit at contact point 42 disconnects capacitor 35 from ground and therefore takes ground off the grid of amplifier tube 21 so that it may now pass signal to the frequency meter 23. It will be apparent that during the transmitting period, "a" (Fig. 2), the oscillator 5 may be driven to a much greater output than the continuous power rating of the oscillator tubes. Also, it will be evident that during the period "b" (Fig. 2) when there is no transmission there will be no undesired signal such as noise signal passed through amplifiers 21 and 22 to produce a false actuation of the frequency indicator circuit.

The above described method of blocking the receiver has an advantage over other methods in that it eliminates any transients due to contact potentials in the circuit.

The frequency meter 23 may be of the "counter" type such as described in my patent application, Serial No. 380,834, filed February 27, 1941, and entitled "Frequency determining devices." For use with the present invention the meter 23 should have either mechanical or electrical damping or decay and the frequency recurrence of the transmitted pulses of energy should be high enough to cause the meter reading to be reasonably steady and continuous. The frequency meter need not be of the "counter" type. For example, it may be a resonant type indicator which comprises a plurality of tuned reeds.

In Fig. 3 there is shown a self-pulsing oscillator 51 that may be substituted for the oscillator 5 of Fig. 1. Oscillator 51 includes a grid resistor 52 and a grid capacitor 53 having such values that the oscillator is caused to block and unblock periodically. By using an oscillator of this type the apparatus is simplified, particularly if no attempt is made to block the receiver between successive pulse radiations.

It may be noted that the radiated pulses of radio frequency signal should be flat topped in order to avoid the introduction of amplitude modulation. However, the above described balanced receiver will balance out any moderate amount of amplitude modulation introduced by departure from the flat topped characteristic.

The apparatus shown in Fig. 1 may be utilized to advantage to measure the Doppler effect for the purpose of determining the ground speed of an airplane, for example. When the apparatus is so used, the frequency modulating oscillator 9 is disconnected from the transmitter so that a constant frequency carrier wave is transmitted. Except for the use of different circuit constants in the receiver because of the different beat frequency obtained, the apparatus for such use is the same as previously described for distance measuring.

It will be apparent from the foregoing that the invention is not limited to the specific embodiments that have been illustrated and described. For example, instead of causing the transmitter oscillator to operate intermittently, an oscillator of less power output may be operated continuously and its output amplified by a power amplifier which is blocked periodically whereby the desired R.-F. signal pulses are radiated.

I claim as my invention:

1. In a radio distance determining system, means for producing a carrier wave which is cyclically frequency modulated and for transmitting it to a reflecting surface, a receiver for receiving said wave after reflection from said surface, said receiver comprising a heterodyne detector, means for applying said reflected wave to said detector, means for also applying a portion of said modulated wave directly from the transmitter to said detector whereby a difference or beat frequency is produced, an amplifier including at least one vacuum tube, a frequency indicator connected to said detector through said amplifier to indicate said beat frequency, means for transmitting said carrier wave as a pulse that lasts for the duration of at least one of said cycles of frequency modulation and which is followed by a period lasting for a comparatively large number of succeeding cycles of frequency modulation before the next pulse occurs, and means for connecting a short-circuiting capacitor across the input circuit of said vacuum tube during said long period following each pulse and for disconnecting said short-circuiting capacitor during the transmission of each pulse.

2. In a radio distance determining system, means including an oscillator for transmitting to a reflecting surface a carrier wave which is cyclically frequency modulated, a receiver for receiving said wave after reflection from said surface, said receiver comprising a heterodyne detector, means for applying said reflected wave to said detector, means for also applying a portion of said modulated wave to said detector before reflection whereby a difference or beat frequency is produced, an amplifier including at least one vacuum tube, a frequency indicator connected to said detector through said amplifier to indicate said beat frequency, said indicator having a certain amount of damping or decay, means for blocking said oscillator for a comparatively large number of said cycles of frequency modulation and for unblocking said oscillator for a comparatively small number of succeeding cycles of frequency modulation, said blocking recurring at a rate such that said damped indicator gives a distance indication reading that is steady enough to be read by an operator, and means for blocking and unblocking said receiver synchronously with said oscillator blocking and unblocking, said last means comprising means for connecting a large capacity capacitor across the input circuit of said vacuum tube during the time said oscillator is blocked.

ROYDEN C. SANDERS, Jr.

REFERENCES CITED

The following references are of record in the file of this patent:

UNITED STATES PATENTS

| Number | Name | Date |
| --- | --- | --- |
| 2,147,810 | Alford | Feb. 21, 1939 |
| 2,256,539 | Alford | Sept. 23, 1941 |
| 2,257,830 | Wolff et al. | Oct. 7, 1941 |
| 2,261,272 | Newhouse | Nov. 4, 1941 |
| 2,181,568 | Kotowski et al. | Nov. 28, 1939 |

FOREIGN PATENTS

| Number | Country | Date |
| --- | --- | --- |
| 474,690 | Great Britain | Nov. 5, 1937 |